(12) United States Patent
Iseli et al.

(10) Patent No.: US 12,535,804 B2
(45) Date of Patent: Jan. 27, 2026

(54) TOOLING MACHINE PROCESS

(71) Applicant: HEXAGON TECHNOLOGY CENTER GMBH, Heerbrugg (CH)

(72) Inventors: Claudio Iseli, Au (CH); Claudio D'Angelo, Lindau (DE); Silvan Meile, St. Gallen (CH)

(73) Assignee: HEXAGON TECHNOLOGY CENTER GMBH, Heerbrugg (CH)

( * ) Notice: Subject to any disclaimer, the term of this patent is extended or adjusted under 35 U.S.C. 154(b) by 139 days.

(21) Appl. No.: 17/963,457

(22) Filed: Oct. 11, 2022

(65) Prior Publication Data

US 2023/0116059 A1 Apr. 13, 2023

(51) Int. Cl.
*G05B 19/418* (2006.01)
*G05B 13/04* (2006.01)
(Continued)

(52) U.S. Cl.
CPC ....... *G05B 19/41885* (2013.01); *G05B 13/04* (2013.01); *G05B 19/4069* (2013.01); *G05B 19/4099* (2013.01); *G05B 2219/33301* (2013.01)

(58) Field of Classification Search
CPC .............. G05B 19/41885; G05B 13/04; G05B 19/4069; G05B 19/4099; G05B 2219/33301
See application file for complete search history.

(56) References Cited

U.S. PATENT DOCUMENTS

| 7,933,679 B1 * | 4/2011 | Kulkarni ............ G05B 13/0265 703/2 |
| 11,079,748 B1 | 8/2021 | Garvey et al. |

(Continued)

FOREIGN PATENT DOCUMENTS

| CN | 111538294 A | 8/2020 |
| CN | 112198812 A | 1/2021 |

(Continued)

OTHER PUBLICATIONS

Sortino, M., et al., "Compensation of geometrical errors of CAM/CNC machined parts by means of 3D workpiece model adaptation," Computer-Aided Design, Elsevier Publishers, vol. 48, pp. 28-38, (Nov. 6, 2013).

(Continued)

*Primary Examiner* — Michael W Choi
(74) *Attorney, Agent, or Firm* — Maschoff Brennan

(57) ABSTRACT

A method for automatically adapting an adaptable process parameter of a tooling machine, the tooling machine being part of a first or second manufacturing process for physically processing input work pieces into output work pieces. According to the method, at least one geometric feature of an output work piece is measured by a coordinate measuring machine, the geometric feature being a direct or indirect result of the processing with the tool. The measurement result is together with nominal measurement data of the geometric feature fed into a deterministic digital simulation of at least a part of the manufacturing process with a digital model such as a digital twin of the tooling machine and modelled process parameters, therein the adaptable process parameter of the tooling machine, simulating at least a deterministic behavior of the tooling machine relevant for an operation of its tool.

30 Claims, 2 Drawing Sheets

(51) Int. Cl.
  *G05B 19/4069* (2006.01)
  *G05B 19/4099* (2006.01)

(56) References Cited

U.S. PATENT DOCUMENTS

| | | | |
|---|---|---|---|
| 2016/0202691 A1* | 7/2016 | Pettersson | G05B 19/41865 |
| | | | 700/98 |
| 2019/0171189 A1* | 6/2019 | Petruzzi | G05B 19/4163 |
| 2020/0150637 A1 | 5/2020 | Yates et al. | |
| 2022/0011727 A1 | 1/2022 | Hlavac et al. | |
| 2022/0207206 A1 | 6/2022 | Zhang et al. | |
| 2023/0055428 A1* | 2/2023 | Nordell | G05B 19/4097 |
| 2023/0152773 A1* | 5/2023 | Brand | G05B 19/404 |
| | | | 700/28 |

FOREIGN PATENT DOCUMENTS

| | | |
|---|---|---|
| CN | 112699504 A | 4/2021 |
| CN | 113168136 A | 7/2021 |
| DE | 10 2019 111 715 A1 | 11/2020 |
| EP | 3045992 B1 | 7/2016 |
| WO | 2021/122548 A1 | 6/2021 |

OTHER PUBLICATIONS

Extended European Search Report dated Jul. 6, 2022 as received in Application No. 21201936.8.
CN Office Action dated Jan. 15, 2025 as received in Application No. 202211220950.6.

\* cited by examiner

TOOLING MACHINE PROCESS

BACKGROUND

The present disclosure relates to a method according to the preamble of the independent claim.

Manufacturing processes, in particular provided by tooling machines, are ubiquitous in the modern world. Manufacturing processes are often configured to transform an input work piece into an output work piece, e.g. a manufacturing process may comprise drilling a hole into a metal sheet. Output work pieces provided by a manufacturing process may deviate from a desired target state, i.e. the manufacturing process may not provide desired results, e.g. due to changing environmental influences slowly influencing the manufacturing process, wherein such slow changes may not be compensated by conventional control algorithms and methods used in manufacturing.

EP3045992B1 discloses a method for controlling a production process of an object wherein a production model of the object such as a CAD-model is adapted based on nominal property data and deviation data of the object. Thus, production errors can be compensated without changing the parameter values of the production facility, i.e. wherein the facility can be treated as a "black box". This approach has the disadvantage that is based on a production model of the object to be produced. An error compensation basically independent on the production model is not possible.

SUMMARY

It is therefore an objective to provide a method for improving output work pieces provided by a manufacturing process.

This objective is achieved by realizing the characterizing features described herein. Features which further develop aspects in an alternative or advantageous manner are also described.

The disclosure relates to a fully automatic method for adapting parameters related to a manufacturing process for adapting the manufacturing process namely for adapting at least one adaptable process parameter of a tooling machine having at least one material removing, for example a milling and/or turning, tool, the tooling machine being part of the manufacturing process. The method comprises measuring of at least one coordinate of at least one geometric feature (position and/or dimension) of an output work piece by a coordinate measuring machine. The geometric feature is a direct or indirect result of the processing with the tool, i.e. the measured position or dimension is caused or at least influenced by the tool's work.

A measurement result—i.e. measured coordinate data—of this coordinative measurement is together with nominal coordinate/geometric data of said feature put into a deterministic digital simulation of at least a part of the manufacturing process with a digital model, preferably a digital twin, of the tooling machine and modelled process parameters, therein the adaptable process parameter of the tooling machine. This inputting is not to be understood as being limited to an explicit input, i.e. that measured and nominal coordinate data/values would have to be directly fed into the simulation; rather this includes, too, that the input might also be in form of a difference between the measured coordinates and the nominal coordinate/geometric data, that is, the measurement result and the nominal data are implicitly or indirectly put in in form of a difference between them or a deviation of the measured coordinate to a nominal value.

With the simulation, a deterministic behavior of the tooling machine relevant for an operation of its tool can be simulated. The simulation is then executed with varying of values of at least one of the modelled process parameters with the objective to emulate the measurement result. Said otherwise, a digital representation of the manufacturing process is used to represent the manufacturing process in such a way by virtually adjusting process parameters that the actual result in form of the geometric feature and thus a deviation from nominal to current can be virtually accomplished or theoretically "explained". This is for example done by virtually setting a machine behavior that reproduces the real one which is expressed or indicated in the geometric feature as measured resp. in the difference between set and measured value(s). Hence, emulation of the measurement result is to be understood in a broad sense in that the measurement result has not necessarily to be explicitly reproduced by the simulation (there needs not to be a dedicated simulated measurement result as simulation output) but that the modelled process parameter is adapted in such a way that the therewith adapted digital simulation fits to the real manufacturing process as expressed by the measured result, the real measurement result signaling or representing the objective or "destination" which however has not to be reached in any case but in some cases it is sufficient to have the simulation adjusted in such a way that a "path" to this objective is provided or that knowledge is gained by an according emulation how the measured result as the "destination" could be reached. This simulation can be an iterative process wherein modeled parameters are estimated as long as the digital process output, related to or as expressed by a feature's geometry, differs from the real output, whereby a certain tolerance can be accepted.

From the simulation with thus adapted modelled process parameters (adapted simulation emulating explicit or implicit the measurement result) and based on nominal geometric data of the feature, an adapted value for the adaptable process parameter is derived which enables an adapted operation of the tooling machine with respect to its tool resulting in a reduced or minimized difference between real and nominal geometric date of the feature. That is, the knowledge gained about the manufacturing process resp. processing parameters from simulating the manufacturing process (or at least part of it) with the digital model of the tooling machine in view of the measured feature (resp. its deviation from nominal geometric data) is then used to adapt one or more of adjustable process parameters of the tooling machine to counter the measured deviation or the tooling machine is operating according to the adapted parameter(s) in such a way that further output work pieces show less deviation from or even completely satisfy the nominal data (of course within certain tolerances). Here again, the simulated adaptable parameter can be adapted iteratively until the simulated output conforms to the nominal, desired output.

The present disclosure also relates to another method for automatically adapting at least one adaptable process parameter of a tooling machine having at least one material removing, in particular milling and/or turning, tool. According to this second aspect, the tooling machine is part of a second manufacturing process for physically processing second input work pieces into second output work pieces. The method comprises a coordinative measurement of at least one geometric feature of a first output work piece by a coordinate measuring machine, the first output work piece being a result of a first manufacturing process, inputting a measurement result of the coordinative measurement and nominal measurement data of the geometric feature into a deterministic digital simulation of at least a part of the first and the second manufacturing process with a digital model, in particular a digital twin, of the tooling machine and modelled process parameters, therein the adaptable process parameter of the tooling machine, simulating at least a deterministic behavior of the tooling machine relevant for an operation of its tool, running the simulation with varying of at least one of the modelled process parameters with the objective to emulate the measurement result, and deriving from the simulation with thus adapted modelled process parameters and based on nominal geometric data of the feature an adapted value for the adaptable process parameter which enables an adapted operation of the tooling machine with respect to its tool resulting in a reduced difference between real and nominal geometric date of the feature. Here again, the inputting and emulation has to be understood in a broad sense as described above.

In the optimal case, the digital representation of the manufacturing process resp. first and second manufacturing process (in the following, when speaking of manufacturing process, both cases or aspects are meant) with its modelled tooling machine allows advantageously to understand why a deviation happens, to locate the source of error. In any case, the digital representation of the manufacturing process with modelled process parameters is the foundation for the choice, the basis of decision-making for countermeasures in form of an adapted operation/control of the tooling machine resp. its tool.

The digital model of the tooling machine is to be understood as a model of at least a part of the tooling machine which is configured to physically transform the input work piece. Parts of the tooling machine which are not directly involved in the physical transformation of the input work piece may, however, be part of the digital representation which comprises the digital model. The digital model may be embodied as a digital twin of the tooling machine providing the manufacturing process, a digital twin being a close and accurate model of the entire tooling machine with which the relevant behavior of the tooling machine can be accurately simulated. The digital model may comprise model parameters, which model parameters may be changed in a simulation. A digital twin of a manufacturing process offers numerous benefits as it allows to simulate the impact of a manufacturing process applied to an input work piece before the physical realization of the manufacturing process. For the digital twin to be useful, it must resemble reality closely. Only close resemblance will allow for meaningful deductions that can be safely and effectively translated to reality.

The parameters related to the manufacturing process may be adapted as follows: if the geometric measurement data differ from corresponding data obtained from the output work piece target, the model parameters may be adapted, and a subsequent evaluation of the digital model using the adapted model parameters may provide a simulated output work piece which can be compared to the output work piece target. The adapted model parameters may be linkable to the parameters relating to the manufacturing process, e.g. by comprising the parameters relating to the manufacturing process or through a mapping in between model parameters and parameters relating to the manufacturing process. The adapted model parameters may be used for adapting the parameters relating to the manufacturing process, the manufacturing process is adapted based on the adapted parameters relating to the manufacturing process.

The coordinate measuring machine may be embodied as a Cartesian orthogonal coordinate measuring machine, or as a coordinate measuring machine using a cylindrical or spherical coordinate system, e.g. provided by an articulated arm coordinate measuring machine. The coordinate measuring machine may comprise non-linear kinematics. The coordinate measuring machine may be embodied as a stacked rotary table coordinate measuring machine, or as a robotic coordinate measuring machine.

Geometric measurement data may comprise shape data of an output work piece, e.g. describing surface points evaluated on the surface of an output work piece by the coordinate measuring machine, or length between points, or area etc. Geometric measurement data may also comprise texture data of an output work piece, texture data e.g. being related to a roughness of a surface of an output work piece.

The measurement result or data provided by the coordinate measuring machine may relate to an already processed output work piece. The coordinate measuring machine may be separate from a tooling machine providing the manufacturing process, or may be integrated into the tooling machine. If integrated into the tooling machine, the coordinate measuring machine may be used to provide measurement data relating to an intermediate state of the work piece, i.e. to a work piece in a processed state between its input work piece state and its final output work piece state at the end of the manufacturing process.

Geometric closeness between output work piece target and output work piece may be evaluated based on the geometric measurement data and corresponding data derived from the output work piece target, e.g. by using an error metric such as mean squared error, e.g. evaluated between points on the output work piece measured with the coordinate measuring machine and corresponding points on the output work piece target.

The simulating of at least a deterministic behavior of the tooling machine relevant for an operation of its tool comprises optionally simulating an operation pose of the tool with respect to at least one translational or rotational degree of freedom based on the digital model, e.g. a position or orientation of the tool relative to the work piece when working on it, and the adapted operation relates to the corresponding physical or real operation pose, e.g. the adapted parameter changes the operation pose, whereby it may be either indirectly or directly linked to the operation pose. In case of a direct link, the parameter is for example a value of a rotational or translational position of the machine part of the tooling machine, in particular the parameter can be one of the tool itself.

As additional or alternative options, the adaptable parameter can also relate to a volumetric map of the tooling machine, which could depend directly or indirectly on time, for example depend on timestamps and/or be a function of desired/nominal operation position of the tool and/or in relation to a distinct or specific command of a part-program. As further options, the parameter relates to a position, rotational speed, travelling speed and/or acceleration of the tooling machine, to a path along individual axes of the tooling machine, and/or to trajectories of the individual axes of the tooling machine, whereby again each of said position etc. is at a certain timestamp and/or as function of desired/nominal operation position of the tool and/or in relation to a distinct or specific command of a part-program (program position, e.g. row of the code) for control of the manufacturing process, The digital model comprises optionally a modeling of a processing force and/or dynamic behavior of the tooling machine, whereby properties of the work piece, which play a role or have an impact on the processing force or dynamic behavior can be taken into account such as the work piece's deformability or stiffness. As another option, the deterministic behavior relates to a deformation of the tooling machine, the deformation being due to due to processing forces, dynamics or environmental impact, in particular temperature impact.

As an optional additional result of the simulation of the process in view of the measured feature resp. its deviation, an adaption of the deterministic digital simulation, in particular of the digital model, is derived and implemented. The digital representation which comprises the digital model may deviate from reality, i.e. it may not describe the manufacturing process sufficiently well. Using the measurement result, the digital representation, and specifically the digital model, may be adapted to conform better to the real manufacturing process. In case the digital model is close to a physical description of at least the process part of the manufacturing process and in case e.g. some environmental factor changes, which changing environmental factor may be detected through the measurement results or through additional sensors, the digital model may be changed to conform better to the changed environmental conditions. In case the digital model was e.g. originally configured to operate in a first temperature range and said first temperature range changes to a second temperature range, the digital model may need to be adapted so as to optimally describe the process part of the manufacturing process operating in the second temperature range. The digital representation metric may measure how accurately the digital representation, specifically the digital model, describes at least the process part of the manufacturing process in changed physical conditions.

In a further embodiment of the method, the method comprises measuring with a sensor a measurement value representing a current condition of the tooling machine, work piece and/or an environmental condition, and inputting the measured value into the simulation. Hence, additional process data is measured and used in the simulation which comprises additionally an according model of the tooling machine, work piece or environment relating to the measured value. Examples for sensors are rotational speed sensors, current sensors in engines, vibrational sensors like microphones, accelerometers and temperature sensors.

In a further embodiment of the method, the sensors are integrated in or attached to the tooling machine, and/or wherein the process measurement data are acquired by the sensors during processing of the at least one input work piece by the tooling machine. The sensors may acquire data during processing, i.e. in an intermediate state of the work piece between its input work piece state and its output work piece state.

In a further embodiment of the method, the process measurement data are related to process parameters of the manufacturing process, and/or to work piece parameters of a processed work piece, the work piece parameters capturing changes to the processed work piece during processing by the manufacturing process.

In a further embodiment of the method, the adapted parameters are physical parameters, wherein adaptation of said adapted parameters is directly linkable to a corresponding modification of the manufacturing process.

Physical parameters may be parameters which can be directly used for adapting a manufacturing process. An example of a physical parameter may be drilling speed of a drill another one may be the correction of one axis orientation with respect to other axes. Physical parameters may be contrasted with abstract parameters, e.g. tooling machine efficiency. Such abstract parameters may typically not directly be used for adapting a manufacturing process, but may instead typically require a plurality of nontrivial modification steps of the manufacturing process.

Said adapted operation may be enabled by modifying a volumetric map of the tooling machine mapping a path, which path the tooling machine is configured to follow, onto at least one individual axis movement via the volumetric map. A volumetric map may provide an exact forward kinematic description of a tooling machine. Such an exact forward kinematic description may allow compensation of non-ideal deviation behavior of axes of the tooling machine, specifically both compensation of deviations of individual axes as well as deviation between axes. A volumetric map may allow a simple reaction to execution errors during a movement. A volumetric map may allow to carry out complex compensations without explicitly modifying source code.

Hence, the G-code instructions as computer numerical control (CNC) programming language may remain unaltered, and the volumetric map may be used on top of the G-code to compensate errors of the tooling machine. Low-frequency and position-dependent and slow effects may be compensated using a volumetric map, while dynamic effects/force effects may be more difficult to compensate using a volumetric map as such effects typically also depend on the manufacturing process itself. In order to compensate dynamic effects/force effects, trajectories may need to be influenced, i.e. time may need to be included as an extra dimension during compensation.

Besides using volumetric maps, paths of the machine tool may be directly corrected; such a direct correction could replace the volumetric map. Paths, however, may typically not be directly accessible and modifiable. Changing a volumetric map may be seen as an indirect method for correcting paths.

Part program or G-code modification or adaption according to the adapted value of the adaptable process parameter can in principle also be used for compensating deviation behavior of a tooling machine. Such a G-code compensation may, however, be difficult to implement, as it is a feature based correction and limits the potential to compensate errors at each point in the machine volume. G-code changes which may be implemented are e.g. spindle speed, tool choice, tool orientation with respect to a work piece etc.

In a further embodiment of the method, the digital representation is configured to use in addition 1) a geometric model and/or a material model of the at least one input work piece, and/or 2) a model representing fixture of the at least one input work piece with respect to the tooling machine.

As another option, the digital representation takes into account environmental factors influencing the manufacturing process in addition to parameters referring to internal factors such as machining forces, internal heat generation, internally generated vibrations, which preferably are part of or integrated in the digital model of the tooling machine. The term environmental factors may be understood to refer to influencing factors influencing the manufacturing process which arise outside the machine tool providing the manufacturing process. Examples for environmental factors are external temperature changes or humidity changes.

In a further embodiment of the method, the adapting of the parameters related to the manufacturing process is additionally based on a measurement process model, which measurement process model digitally represents the measurement process providing the measurement result. Hence in addition to the manufacturing process representation, the simulation comprises a measurement process model, which measurement process model digitally represents said measurement of coordinates with a CMM. Alternatively or additionally, the measurement model models a measurement of a measurement sensor as described above. Systematic errors of a coordinate measuring machine or sensor may be at least partly compensated using a measurement process model, improving the overall adaptation process as measurement results provided by the coordinate measuring machine may be more precise.

In a further embodiment of the method, the digital representation is embodied as a digital analytic model or as a digital numeric model, in particular a finite element model of the part of the tooling machine, or as a combined digital analytic-numeric model. The digital model for instance is based on a polynomial, machine learning and/or finite elements. The model may describe various physical effects like the dynamic compliancy of the tooling machine, e.g. as a result of force and acceleration applied on the active joints of the machine, like the inhomogeneous thermal expansion of the machine due to environmental situation around the machine as well due to internal wasted energy.

In a further embodiment of the method, adapting the manufacturing process comprises modifying a control or part program configured to control the tooling machine, in particular modifying a set of instructions of the control program, the modified set of instructions in particular being G-code parameters. Due to the complexity of G-code, typically only individual parameters may be modified.

In a further embodiment of the method, adapting the manufacturing process comprises modifying the volumetric map, and adapting the manufacturing process by mapping a path, which path the tooling machine is configured to follow, onto at least one individual axis movement via the volumetric map.

The disclosure also relates to a computer program product for adapting parameters related to a manufacturing process as in the method.

BRIEF DESCRIPTION OF THE DRAWINGS

The method is described below in more detail purely by way of example with the aid of concrete exemplary embodiments illustrated schematically in the drawings, further advantages of the disclosure also being examined Identical elements are labelled with the same reference numerals in the figures.

DETAILED DESCRIPTION

Figure 1:
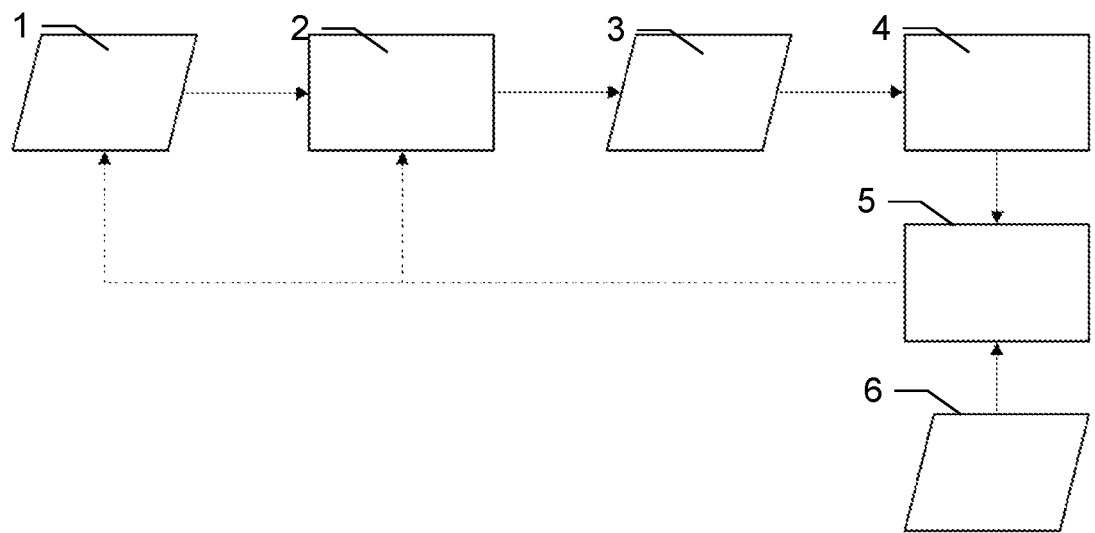
FIG. 1 shows a schematic depiction of the method for improving a manufacturing process.

FIG. 1 shows a schematic depiction of the method for improving a manufacturing process 2. Input work pieces 1 are provided to the manufacturing process 2 which transforms input work pieces 1 into output work pieces 3. The manufacturing process 2 is configured to produce output work pieces 3 which are ideally as close as possible to an output work piece target 6, the term close as possible referring to closeness in a geometric sense, e.g. referring to shape or texture. However in reality, the actually produced output work pieces 3 mostly or in general differ from the ideal output work piece target 6. The method is configured to gradually improve the manufacturing process 2 to decrease this difference using a digital representation, preferably a digital twin, of the manufacturing process 2.

A first input work piece 1 is transformed by the manufacturing process 2 to a first output work piece 3. The first output work piece 3 is measured in a measurement process 4, the measurement process 4 providing geometric measurement data, e.g. relating to shape or texture of the first output work piece 3. The measurement process 4 uses a coordinate measuring machine, which coordinate measuring machine may be physically separate from manufacturing tools providing the manufacturing process 2, or which coordinate measuring machine may be integrated into the manufacturing tools providing the manufacturing process.

The provided geometric measurement data are subsequently used to adapt 5 the manufacturing process prior to transformation to a second output work piece 3. The adaptation 5 is based on a comparison of output work piece target 6 and the geometric measurement data provided by the measurement process 4 evaluated on the first output work piece 3.

The adaptation 5 of the manufacturing process and/or of the second input work piece 1 may work as follows: a digital model, e.g. a digital twin, of at least a process part of the manufacturing process, and optionally a desired geometric output model, the input geometrical model incl. material data together with G-code instructions as well as machine positions of the second input work piece 1 are given, which digital model and geometric model comprise model parameters. At least a part of the transformation from second input work piece to second output work piece can be simulated based on at least the digital model and the geometric model, the simulation represents physical effects of at least a process part of the manufacturing process and providing at least a simulated part of the second output work piece.

By adapting the model parameters of the digital model and/or of the geometric model of the second input work piece and performing a simulation using the adapted model parameters, a set of model parameters may be identified which provides a simulated second output work piece which is geometrically closer to the output work piece target than the manufactured first output work piece. Using the adapted model parameters, the manufacturing process 2 and/or the second input work piece 1 are adapted in such a way that they conform to the adapted parameters, and the second output work piece 3 is manufactured. The adaptation of the manufacturing process 2 and/or of the second input work piece 1 may proceed by adapting parameters related to the manufacturing process 2 using the adapted model parameters. The parameters related to the manufacturing process 2 may also be part of the model parameters.

The adaptation of the manufacturing process may also be based on having manufactured n output work pieces, n denoting a natural number greater than 1, and using geometric measurement data obtained from measuring the n output work pieces to adjust the n+1th input work piece and/or the manufacturing process in order to improve manufacturing of the n+1th output work piece. The adaptation of the parameters related to the manufacturing process and indirectly of the manufacturing process itself may be done based on statistical information obtained from the n output work pieces.

The digital model and/or the geometric model of the second input work piece may comprise model parameters which are directly linkable to physical parameters of the manufacturing process 2. If such physical parameters related to the manufacturing process are adapted, the manufacturing process 2 is directly influenced. Physical parameters are therefore different from purely abstract parameters which do not have a clear-cut or distinct physical counterpart in the real world. An abstract parameter could be a parameter which cannot be directly mapped to a change affecting the manufacturing process 2. An example for an abstract parameter is process efficiency, and an example for a physical parameter is drilling speed. In case the digital model and/or the geometric model comprise the parameters related to the manufacturing process and these parameters are physical parameters, a change in said physical parameters determined in a simulation can directly be transferred to a change in the underlying physical manufacturing process and/or second input work piece.

Figure 2:
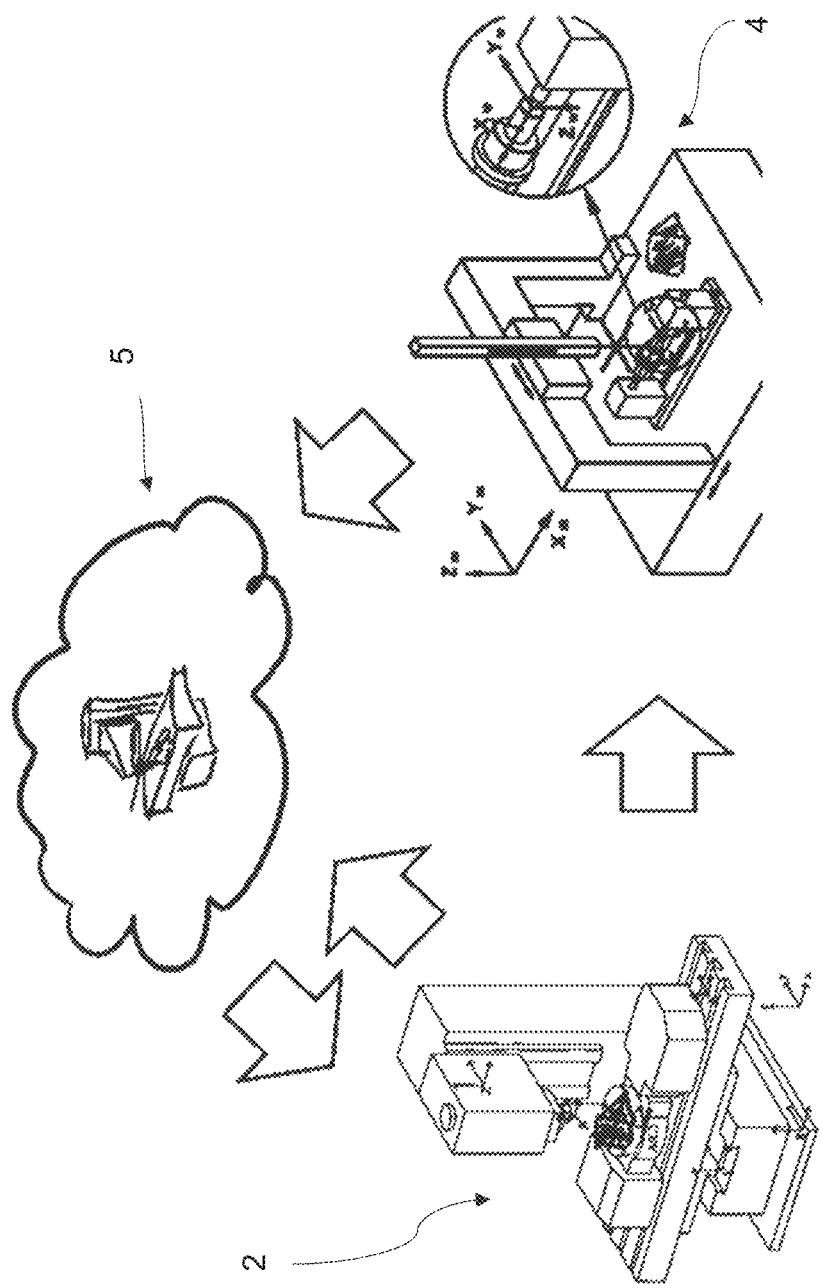
FIG. 2 shows another schematic depiction of the method for improving a manufacturing process, and FIG. 3 another example of a method.

FIG. 2 shows another schematic depiction of the method for improving a manufacturing process 2. A digital model 5 of at least a process part of the manufacturing process 2 is given, which digital model 5 is able to accurately model a physical process part of the manufacturing process 2, e.g. a drilling step. Information may flow both from the physical manufacturing process 2 to the digital model 5, specifically in order to set up and align the digital model 5 with respect to the real process, and from the digital model 5 to the physical manufacturing process 2, specifically for adapting the physical manufacturing process 2 based on an adaptation of the digital model 5.

Adaptation of the digital model 5 is done based on measurement results obtained from a measurement process 4 performed on output work piece(s) of the manufacturing process 2, whereby results of a coordinative measurement together with or in relation to (e.g. in form of a deviation to) nominal coordinative data are used as input to the digital model 5. If the output work piece(s) differ from a desired and simulated target work piece, the manufacturing process 2 and/or an input work piece into the manufacturing process are adapted, wherein adaptation is based on adapting model parameters of the digital model 5. The adaptation and/or the preceding method steps can thereby be implemented as in principle described in the example given with respect to FIG. 1.

Figure 3:
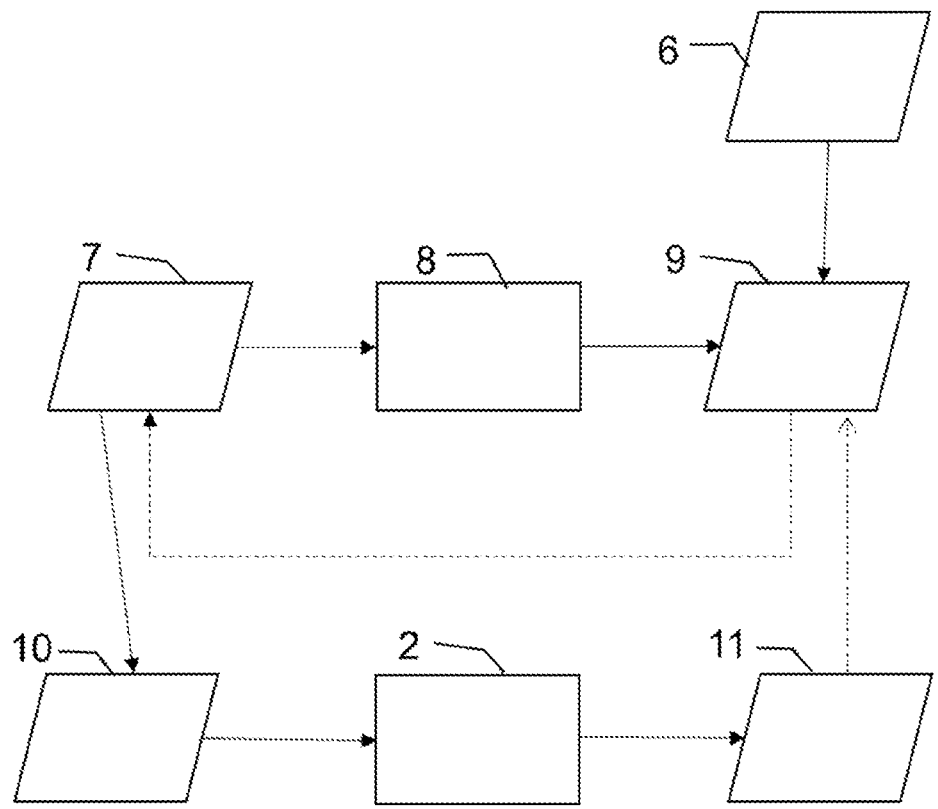

FIG. 3 shows another schematic depiction of the method. There is a digital representation 8 of the manufacturing process or at least a sequence of it which is e.g. stored on a CPU in communication to a tooling machine and a CMM. The digital representation 8 comprises at least a digital model of the tooling machine, an autonomous and automatic interpretation of measuring data of the CMM and data interpretation and exchange between manufacturing and measuring.

An input work piece is manufactured or formed by the tooling machine which is used in the manufacturing process, resulting in an output work piece with desired geometry. Data 6 describing desired values is stored and available for the simulation 8, whereby additional data such a data describing material properties of the work piece can be made available. The tooling machine comprise actuators and preferably sensors. Such a sensor can for example measure a position of a tool tip or the workpiece, speed of a part of the tooling machine, in particular number of revolutions, or an orientation of the tooling machine resp. a section of it. The digital representation 8 simulates the manufacturing process. Therein, a digital twin of the tooling machine is used and controlled according to input control parameters 7 which model the ones used in the real manufacturing process 2.

The (real or physical) manufacturing process 2 results in an output work piece which is metrologically measured making geometric measurement data 11 available. The measurement can be executed according to a digital model of the work piece.

After measuring, the measurement data 11 is compared to output parameter 9 of the digital representation 8, considering the nominal data 6. When beginning with a "fresh" digital representation 8, it is to be expected that it does not exactly emulate the real manufacturing process 2 or the tooling machine's behaviour. For instance, input parameters 7 may be used which are different to the real parameters 10 of the tooling machine, work piece or the manufacturing environment or other conditions, which result in a deviation between actual results and desired ones.

The digital representation 8 is now optimized by variation of virtual process parameters 7 in such a way that its output matches the measured data 11 of the real object. Thereby, it is a goal to locate the reason for the deviation, i.e. to find out why the initial process parameters are not fitting or complying to reality.

For the optimization, data of sensors or actuators of the tooling machine as well as of the measuring machine and model data, historical data and so on can be used. The data is analysed using e.g. neuronal networks, machine learning or AI for parameter optimization and/or evaluation of error source. The optimization is done or repeated until the deviation is below a certain threshold. Finally, there is an optimized digital representation 8 which comprises enhanced or additional information about the real manufacturing process 2 that at the start.

This improved knowledge about the process 2 and corresponding input parameters 7 are then used to adapt adaptable input parameters 7 in such a way that the nominal data 6 can be achieved by the enhanced digital representation 8 with improved model process parameters 7. This is done by an iterative process in which input parameters 7 which represent controllable parameters 7 relevant for the outcome (feature or geometry of the work piece considered) are estimated until the outcome conforms to the nominal data 6. That is, first the digital representation 8 is enhanced—or more particularly a digital model of the tooling machine or used process parameters—based on the measurement information, giving insight into the real manufacturing process 2, to better simulate or represent this process 2, and second, the thus enhanced digital representation 8—which now reproduces optimally the actual manufacturing process as it is in reality (for now) or actual condition of the tooling machine—is used to find working parameters 10 for the tooling machine which will result in processed workpieces showing no deviation to the nominal geometry or at least less deviation. In the latter case, the method can be repeated. In particular, the method can be a continuous backing or constant part of the manufacturing process 2 such that an in-situ monitoring and optimization of the manufacturing process 2 is provided.

The digital representation 2 may comprise a process model of the tooling machine such as a digital twin, a process model which relates to processing steps, an adaption model, which uses the digital twin to estimate better complying input parameters, a model of the work piece with information of geometry, material and/or manufacturing fixation, e.g. data about the work piece according to information of the work piece as manifested in the g-code. Thereby it is to note that the optimization is basically independent of or not focused on the work piece but rather is for correction of deterministic and physical effects of the processing itself/the processing machinery (in particular tooling machine), using insights to the manufacturing process replicated in its digital representation 2.

The digital twin 2 can be an analytical model, describing for example in continuum mechanics for certain simplified geometrics a deformation of the tooling machine due to physical force, temperature, dynamics (accelerations) or load. It can be a numerical model, e.g. a polynomial description of a behaviour (deformation) with certain constants and varying input parameters (e.g. temperature), a machine learning based model (classical regression based or neural network, deep learning) or a discretized geometrical description, where a bodies are split in finite small sub-bodies whereby any effects due to physical load are estimated on each sub-body and at the end the superposition of all sub-body effects describes the system effects. It can also be both, e.g. analytical and numerical sub models.

Although aspects are illustrated above, partly with reference to some preferred embodiments, it must be understood that numerous modifications and combinations of different features of the embodiments can be made. All of these modifications lie within the scope of the appended claims.

The invention claimed is:

1. A method for automatically adapting at least one adaptable process parameter of a tooling machine having at least one material removing tool, the tooling machine being part of a manufacturing process for physically processing input work pieces into output work pieces, the method comprising:
   a coordinative measurement of at least one geometric feature of an output work piece of the output work pieces by a coordinate measuring machine, the at least one geometric feature being a direct or indirect result of the processing with a material removing tool of the at least one material removing tool,
   inputting a measurement result of the coordinative measurement and nominal measurement data of the at least one geometric feature of the output work piece into a deterministic digital simulation of at least a part of the manufacturing process with a digital model including a digital twin of the tooling machine and modelled process parameters including the at least one adaptable process parameter of the tooling machine, simulating at least a deterministic behavior of the tooling machine relevant for an operation of the material removing tool by said deterministic digital simulation,
   running the deterministic digital simulation with varying of at least one of the modelled process parameters with an objective to emulate the measurement result for deriving adapted modelled process parameters enabling emulating the measurement result,
   deriving an adapted value for the at least one adaptable process parameter from the deterministic digital simulation with thus adapted modelled process parameters, whereby the deriving is based on nominal geometric data of the at least one geometric feature, the adapted value enables an adapted operation of the tooling machine with respect to the material removing tool resulting in a reduced difference between real and the nominal geometric data of the at least one geometric feature.

2. The method according to claim 1, wherein the simulating at least a deterministic behavior of the tooling machine relevant for an operation of its tool comprises simulating an operation pose of the tool with respect to at least one translational or rotational degree of freedom based on the digital model and wherein the adapted operation relates to a corresponding real operation pose.

3. The method according to claim 2, wherein the at least one adaptable parameter is directly linked to the operation pose.

4. The method according to claim 1, wherein the at least one adaptable parameter:
   is a parameter of the tool and/or
   relates to a volumetric map of the tooling machine, in particular whereby the volumetric map directly or indirectly depends on time.

5. The method according to claim 1, wherein the at least one adaptable parameter:
   relates to a position, rotational speed, travelling speed and/or acceleration of the tooling machine,
   relates to a path along individual axes of the tooling machine, and/or
   relates to trajectories of the individual axes of the tooling machine,
   each at certain timestamp and/or as function of desired operation position and/or in relation to a distinct command of a part-program.

6. The method according to claim 1, wherein the digital model comprises a modeling of a processing force and/or dynamic behavior of the tooling machine.

7. The method according to claim 1, wherein the deterministic behavior relates to a deformation of the tooling machine.

8. The method according to claim 1, wherein the digital model is embodied as a digital analytic model and/or as a digital numeric model, based on a polynomial, machine learning and/or finite elements.

9. The method according to claim 1, wherein the method comprises measuring with a sensor a measurement value of the tooling machine, the output work piece and/or an environmental condition, and inputting the measured value into the simulation, wherein the digital model comprises a modeling relating to the measurement value.

10. The method according to claim 9, wherein the measuring is executed during processing of an input work piece of the input work pieces by the tooling machine.

11. The method according to claim 1, wherein the simulation comprises a measurement process model, the measurement process model digitally represents the coordinative measurement and/or a measurement of a measurement sensor.

12. The method according to claim 1, wherein from the simulation, an adaption of the deterministic digital simulation of the digital model is derived and implemented.

13. The method according to claim 1, wherein the adapted operation is enabled by modifying a part program configured to control the tooling machine, in particular modifying a g-code, according to the adapted value for the adaptable process parameter.

14. The method according to claim 1, wherein the adapted operation is enabled by modifying a volumetric map of the tooling machine mapping a path, the path the tooling machine is configured to follow, onto at least one individual axis movement via the volumetric map.

15. A non-transitory computer program product, comprising program code which is stored on a non-transitory machine-readable medium and having computer-executable instructions which when executed cause a computer to perform the method according to claim 1.

16. A method for automatically adapting at least one adaptable process parameter of a tooling machine having at least one material removing tool, the tooling machine being part of a second manufacturing process for physically processing first output work pieces into second output work pieces, the first output work piece being a result of a first manufacturing process, the method comprising:
 a coordinative measurement of at least one geometric feature of a first output work piece by a coordinate measuring machine,
 inputting a measurement result of the coordinative measurement and nominal measurement data of the at least one geometric feature of the first output work piece into a deterministic digital simulation of at least a part of a combination of the first and the second manufacturing processes with a digital model including a digital twin of the tooling machine and modelled process parameters including the at least one adaptable process parameter of the tooling machine, simulating at least a deterministic behavior of the tooling machine relevant for an operation of the at least one material removing tool by said deterministic digital simulation,
 running the deterministic digital simulation with varying of at least one of the modelled process parameters with an objective to emulate the measurement result for deriving adapted modelled process parameters enabling emulating the measurement result,
 deriving an adapted value for the at least one adaptable process parameter from the deterministic digital simulation with thus adapted modelled process parameters, whereby the deriving is based on nominal geometric data of the at least one geometric feature, the adapted value enables an adapted operation of the tooling machine with respect to the material removing tool resulting in a reduced difference between real and the nominal geometric data of the at least one geometric feature.

17. The method according to claim 16, wherein simulating at least a deterministic behavior of the tooling machine relevant for an operation of its tool comprises simulating an operation pose of the tool with respect to at least one translational or rotational degree of freedom based on the digital model and wherein the adapted operation relates to the corresponding real operation pose.

18. The method according to claim 17, wherein the at least one adaptable parameter is directly linked to the operation pose.

19. The method according to claim 16, wherein the at least one adaptable parameter:
 is a parameter of the tool and/or
 relates to a volumetric map of the tooling machine, in particular whereby the volumetric map directly or indirectly depends on time.

20. The method according to claim 16, wherein the at least one adaptable parameter:
 relates to a position, rotational speed, travelling speed and/or acceleration of the tooling machine,
 relates to a path along individual axes of the tooling machine, and/or
 relates to trajectories of the individual axes of the tooling machine,
 each at certain timestamp and/or as function of desired operation position and/or in relation to a distinct command of a part-program.

21. The method according to claim 16, wherein the digital model comprises a modeling of a processing force and/or dynamic behavior of the tooling machine.

22. The method according to claim 16, wherein the deterministic behavior relates to a deformation of the tooling machine.

23. The method according to claim 16, wherein the digital model is embodied as a digital analytic model and/or as a digital numeric model, based on a polynomial, machine learning and/or finite elements.

24. The method according to claim 16, wherein the method comprises measuring with a sensor a measurement value of the tooling machine, the first output work piece and/or an environmental condition, and inputting the measured value into the simulation, wherein the digital model comprises a modeling relating to the measurement value.

25. The method according to claim 24, wherein the measuring is executed during processing of the first output work piece by the tooling machine.

26. The method according to claim 16, wherein the simulation comprises a measurement process model, the measurement process model digitally represents said coordinative measurement and/or a measurement of a measurement sensor.

27. The method according to claim 16, wherein from the simulation, an adaption of the deterministic digital simulation, in particular of the digital model, is derived and implemented.

28. The method according to claim 16, wherein the adapted operation is enabled by modifying a part program configured to control the tooling machine, in particular modifying a g-code, according to the adapted value for the adaptable process parameter.

29. The method according to claim 16, wherein the adapted operation is enabled by modifying a volumetric map of the tooling machine mapping a path, the path the tooling machine is configured to follow, onto at least one individual axis movement via the volumetric map.

30. A non-transitory computer program product, comprising program code which is stored on a non-transitory machine-readable medium and having computer-executable instructions which when executed cause a computer to perform the method according to claim 16.

* * * * *